United States Patent
Lorey (10) Patent No.: US 8,616,644 B2
(45) Date of Patent: Dec. 31, 2013

(54) VEHICLE SEAT WITH SLIDE ELEMENT

(75) Inventor: Konstantin Lorey, Schmidgaden (DE)

(73) Assignee: Grammer AG, Amberg (DE)

( * ) Notice: Subject to any disclaimer, the term of this patent is extended or adjusted under 35 U.S.C. 154(b) by 222 days.

(21) Appl. No.: 13/040,489

(22) Filed: Mar. 4, 2011

(65) Prior Publication Data
US 2011/0278894 A1    Nov. 17, 2011

(30) Foreign Application Priority Data

Mar. 4, 2010 (DE) .......................... 10 2010 010 290

(51) Int. Cl.
*A47C 1/00* (2006.01)

(52) U.S. Cl.
USPC ................... 297/344.15; 297/344.14

(58) Field of Classification Search
USPC .................. 297/344.12, 344.15, 463.1
See application file for complete search history.

(56) References Cited

U.S. PATENT DOCUMENTS

| | | | |
|---|---|---|---|
| 2,118,456 A | 5/1938 | Whedon | |
| 3,300,203 A | 1/1967 | Carter et al. | |
| 3,752,432 A | 8/1973 | Lowe | |
| 4,151,973 A | 5/1979 | Sedlock | |
| 4,213,594 A | 7/1980 | Pietsch et al. | |
| 4,286,765 A | 9/1981 | Delgleize et al. | |
| 4,350,317 A | 9/1982 | Aondetto | |
| 4,408,744 A | 10/1983 | Thompson | |
| 4,451,079 A | 5/1984 | Takahashi | |
| 4,477,050 A | 10/1984 | Thompson et al. | |
| 4,573,657 A | 3/1986 | Sakamoto | |
| 4,645,169 A | 2/1987 | Mischer | |
| 4,679,760 A | 7/1987 | Dotzler et al. | |
| 4,684,100 A | 8/1987 | Grassl | |
| 4,729,539 A | 3/1988 | Nagata | |
| 4,773,671 A | 9/1988 | Inagaki | |
| 4,784,434 A | 11/1988 | Iwami | |
| 4,856,763 A | 8/1989 | Brodersen et al. | |
| 4,943,037 A | 7/1990 | Brodersen et al. | |
| 4,993,778 A | 2/1991 | Colin et al. | |
| 5,058,852 A | 10/1991 | Meier et al. | |

(Continued)

FOREIGN PATENT DOCUMENTS

| CN | 100493951 C | 6/2009 |
|---|---|---|
| DE | 1 898 307 U | 8/1964 |

(Continued)

OTHER PUBLICATIONS

Search Report for European Patent Application No. 11177689.4, mailed Dec. 14, 2011.

(Continued)

*Primary Examiner* — Philip Gabler
(74) *Attorney, Agent, or Firm* — Lathrop & Gage LLP (57) ABSTRACT

The invention relates to a vehicle seat with an upper part (2, 3, 7) comprising a seat part (2) and a backrest (3), and a lower part (11), wherein a vertically adjustable seat frame (4) with at least two scissor arms (5, 6) connected to each other in a rotatable manner is arranged between the upper seat part (2, 3, 7) and the lower seat part (11), wherein at least one first end (5*a*, 6*a*) of at least one of the scissor arms (5, 6) is connected to at least one slide element (12) for the displacement— sliding in at least one displacement direction (10)—of the first end (5*a*, 6*a*) along at least one guide rail (7, 11).

9 Claims, 12 Drawing Sheets

(56) References Cited

U.S. PATENT DOCUMENTS

| | | | |
|---|---|---|---|
| 5,125,631 A | 6/1992 | Brodersen et al. | |
| 5,211,369 A | 5/1993 | Hoemer | |
| 5,251,864 A | 10/1993 | Itou | |
| 5,364,060 A | 11/1994 | Donovan et al. | |
| 5,521,821 A | 5/1996 | Shimizu et al. | |
| 5,533,703 A | 7/1996 | Grassl et al. | |
| 5,553,911 A | 9/1996 | Bodin et al. | |
| 5,582,385 A | 12/1996 | Boyle et al. | |
| 5,735,509 A | 4/1998 | Gryp et al. | |
| 5,765,802 A * | 6/1998 | Bostrom et al. | 248/575 |
| 5,791,738 A | 8/1998 | Niezoldt | |
| 5,794,911 A | 8/1998 | Hill | |
| 5,871,198 A * | 2/1999 | Bostrom et al. | 248/588 |
| 5,957,426 A | 9/1999 | Brodersen | |
| 5,967,604 A | 10/1999 | Yoshida et al. | |
| 5,971,116 A | 10/1999 | Franklin | |
| 6,042,093 A | 3/2000 | Garelick | |
| 6,340,201 B1 | 1/2002 | Higuchi | |
| 6,478,102 B1 | 11/2002 | Puterbaugh et al. | |
| 6,543,755 B2 | 4/2003 | Monson et al. | |
| 6,616,116 B1 | 9/2003 | Rochau et al. | |
| 6,637,735 B2 | 10/2003 | Monson et al. | |
| 6,763,550 B2 | 7/2004 | Regnier | |
| 6,802,408 B2 | 10/2004 | Krammer | |
| 7,044,553 B2 | 5/2006 | Ropp | |
| 7,152,839 B2 | 12/2006 | Mullinix et al. | |
| 7,168,671 B2 * | 1/2007 | Bostrom et al. | 248/419 |
| 7,185,867 B2 | 3/2007 | Hill et al. | |
| 7,712,836 B2 | 5/2010 | Deml | |
| 7,810,884 B2 | 10/2010 | Lorey et al. | |
| 7,886,882 B2 | 2/2011 | Behmenburg et al. | |
| 7,942,248 B2 | 5/2011 | St. Clair et al. | |
| 8,118,287 B2 | 2/2012 | Schordine | |
| 2001/0035600 A1 | 11/2001 | St. Clair | |
| 2002/0011699 A1 | 1/2002 | St. Clair | |
| 2006/0278805 A1 | 12/2006 | Haller | |
| 2007/0278723 A1 | 12/2007 | Shoemaker et al. | |
| 2008/0000738 A1 | 1/2008 | Zdeb | |
| 2008/0000739 A1 | 1/2008 | Behmenburg et al. | |
| 2008/0088165 A1 | 4/2008 | Deml | |
| 2008/0156602 A1 | 7/2008 | Hiemenz et al. | |
| 2008/0197684 A1 | 8/2008 | Ott et al. | |
| 2009/0134595 A1 | 5/2009 | Haller et al. | |
| 2009/0179390 A1 | 7/2009 | Wurmthaler et al. | |
| 2009/0184448 A1 | 7/2009 | Hiser | |
| 2009/0256293 A1 | 10/2009 | Ward | |
| 2009/0283944 A1 | 11/2009 | Schordine | |
| 2010/0052356 A1 | 3/2010 | Lewis, II | |
| 2010/0072800 A1 * | 3/2010 | Weber et al. | 297/344.15 |
| 2010/0102493 A1 | 4/2010 | Deml et al. | |
| 2010/0117428 A1 * | 5/2010 | Deml et al. | 297/344.15 |
| 2011/0001033 A1 | 1/2011 | Kohl et al. | |
| 2011/0001342 A1 | 1/2011 | Deml et al. | |
| 2011/0022265 A1 | 1/2011 | Sekiya | |
| 2011/0226930 A1 | 9/2011 | Enns et al. | |
| 2011/0278894 A1 | 11/2011 | Lorey | |
| 2012/0025577 A1 | 2/2012 | Kolb | |
| 2012/0043798 A1 | 2/2012 | Haller et al. | |
| 2012/0049421 A1 | 3/2012 | Haller et al. | |
| 2012/0086159 A1 | 4/2012 | Kolb | |
| 2012/0090930 A1 | 4/2012 | Haller | |
| 2012/0091773 A1 | 4/2012 | Lorey | |
| 2012/0126592 A1 | 5/2012 | Kaessner et al. | |
| 2012/0153689 A1 | 6/2012 | Haller et al. | |
| 2012/0153695 A1 | 6/2012 | Haller et al. | |
| 2012/0187615 A1 | 7/2012 | Haller et al. | |

FOREIGN PATENT DOCUMENTS

| | | |
|---|---|---|
| DE | 15 55 056 | 3/1970 |
| DE | 19 16 403 A1 | 10/1970 |
| DE | 21 13 579 | 10/1972 |
| DE | 28 06 247 C2 | 8/1979 |
| DE | 28 11 034 A1 | 9/1979 |
| DE | 28 51 129 A1 | 6/1980 |
| DE | 32 42 287 A1 | 5/1984 |
| DE | 35 17 345 A1 | 11/1986 |
| DE | 38 24 272 A1 | 3/1990 |
| DE | 41 01 221 A1 | 7/1992 |
| DE | 696 06 732 T2 | 4/1995 |
| DE | 197 56 252 A1 | 7/1998 |
| DE | 197 41 602 A1 | 3/1999 |
| DE | 603 20 456 T2 | 12/2002 |
| DE | 699 08 290 T2 | 5/2004 |
| DE | 10 2005 028 725 A1 | 1/2006 |
| DE | 10 2006 016 047 B3 | 4/2006 |
| DE | 10 2005 003 833 | 6/2006 |
| DE | 10 2005 011 856 B3 | 8/2006 |
| DE | 10 2007 030 467 A1 | 1/2009 |
| DE | 10 2008 016 685 B3 | 6/2009 |
| DE | 10 2008 010 719 A1 | 8/2009 |
| DE | 10 2008 045 492 A1 | 3/2010 |
| DE | 10 2008 052 960 A1 | 4/2010 |
| DE | 10 2008 056 200 A1 | 5/2010 |
| DE | 10 2009 020 034 A1 | 11/2010 |
| DE | 10 2009 040 010 A1 | 1/2011 |
| EP | 0 054 880 A1 | 12/1981 |
| EP | 0 054 947 A1 | 12/1981 |
| EP | 0 089 794 | 9/1983 |
| EP | 0 448 340 A2 | 9/1991 |
| EP | 0 739 766 | 10/1996 |
| EP | 1 035 258 | 9/2000 |
| EP | 2 420 404 | 2/2012 |
| GB | 1 166 258 | 10/1969 |
| GB | 1199577 | 7/1970 |
| GB | 1 383 922 | 2/1974 |
| GB | 2 014 522 | 8/1979 |
| JP | 63220026 A | 9/1988 |
| JP | 1237471 A | 9/1989 |
| JP | 09136611 | 5/1997 |
| JP | 2007 062 539 A | 3/2007 |
| WO | WO 2004/110808 | 12/2004 |

OTHER PUBLICATIONS

Office Action for German Patent Application No. 10 2010 035 888.6 mailed Jun. 9, 2011.
Office Action for German patent application No. 10 2010 048 210.2, mailed Jul. 7, 2011.
Office Action for German patent application No. 10 2010 051 325.3, mailed Oct. 10, 2011.
Office Action for German Patent Application No. 10 2010 055 342.5, mailed Oct. 6, 2011.
Extended European Search Report for parallel European Patent Application No. 11 19 5031, mailed Apr. 5, 2012.
Office Action for German Patent Application No. 10 2010 055 344.1, mailed Oct. 5, 2011.
Examination Report dated Aug. 24, 2012, from the German Patent Office for German Patent Application No. 10 2010 026 569.1.
First Office Action dated Mar. 29, 2012 for Chinese Patent Application No. 201010244916.3.
First Office Action dated Mar. 29, 2012 for Chinese Patent Application No. 201010244916.3, English translation.
Office Action, Chinese Patent Application No. 201110052443.1, dated Dec. 30, 2012.
Office Action, Chinese Patent Application No. 201110052443.1, dated Dec. 30, 2012, English Translation.
Examination Report for German Patent Application No. 10 2011 009 530.6 dated May 4, 2012.
Extended European Search Report for European Patent Application No. 12 159 863.5, dated Jul. 4, 2012.
Office Action for German Patent Application No. 10 2011 015 364.0, mailed Feb. 6, 2012.
Extended European Search Report for parallel European Patent Application No. 11 19 5039, mailed Apr. 5, 2012.
European Search Report for European Patent Application No. 12 159 863.5, mailed Jul. 10, 2013.

* cited by examiner

VEHICLE SEAT WITH SLIDE ELEMENT

CROSS REFERENCE TO RELATED APPLICATION

This application claims the benefit of priority from German Patent Application No. 10 2010 010 290.3, filed on Mar. 4, 2010, which is hereby incorporated by reference in its entirety.

DESCRIPTION

The invention relates to a vehicle seat with an upper seat part comprising a seat part and a backrest, and a lower seat part, in which case a height-adjustable seat frame with at least two scissor arms connected to each other in an articulated manner is arranged between the upper seat part and the lower seat part.

It is customary for vehicle seats frequently to have height-adjustable seat frames which are assembled from two or more scissor arms. In this case the scissor arms are connected to each other in an articulated manner in the middle region thereof, so that they can be extended towards the top and the bottom, which is accompanied at the same time by a displacement of at least one end of each scissor arm, preferably in the horizontal direction.

A displacement in this way in a displacement direction preferably orientated horizontally takes place in such a way that at least one of the ends of the scissor arms has rolls which roll along inside a guide rail which likewise extends preferably horizontally and wherein the scissor arms are connected to the upper seat part at one end and the lower seat part at the other end. An attachment of rolls in this way frequently has the drawback that they have to be produced in an expensive manner since they frequently have to be produced from metal or from plastics material with a metal bearing and have to be connected to the ends of the scissor arms by means of a plurality of assembly steps. In addition, in the event of wear of the rolls and/or the guide rails which are frequently preferably made U-shaped in their cross-section and which surround the rolls, it is necessary to exchange the rolls in a time-consuming and costly manner.

A further drawback is that the rolls as well as the guide rails have to be produced with a high degree of fitting accuracy in order to ensure a virtually clearance-free rolling of the rolls inside the guide rail and thus to make the vehicle seat safe in the event of an accident.

In this way the object of the invention is to make available a vehicle seat with an upper seat part and a lower seat part as well as a seat frame arranged between them, which will allow an inexpensive and rapid production of a seat frame attached between the upper seat part and the lower seat part as well as a rapid assembly of the seat frame with the remaining components of the vehicle seat.

This object is attained according to the features of claim 1.

An essential aspect of the invention lies in the fact that in the case of a vehicle seat with an upper seat part comprising a seat part and a backrest and a lower seat part, in which case a height-displaceable seat frame with at least two scissor arms connected to each other in an articulated manner is arranged between the upper seat part and the lower seat part, at least one first end of at least one of the scissor arms is connected to at least one slide element for the displacement—sliding in at least one displacement direction—of the first end inside at least one guide rail. On account of the arrangement of slide elements instead of rolls it is advantageously made possible for an inexpensive and rapid production of these elements, for example of plastics material, which run along the guide rails. In addition, a rapid connection of these slide elements to ends of the scissor arms is made possible.

Figure 1:
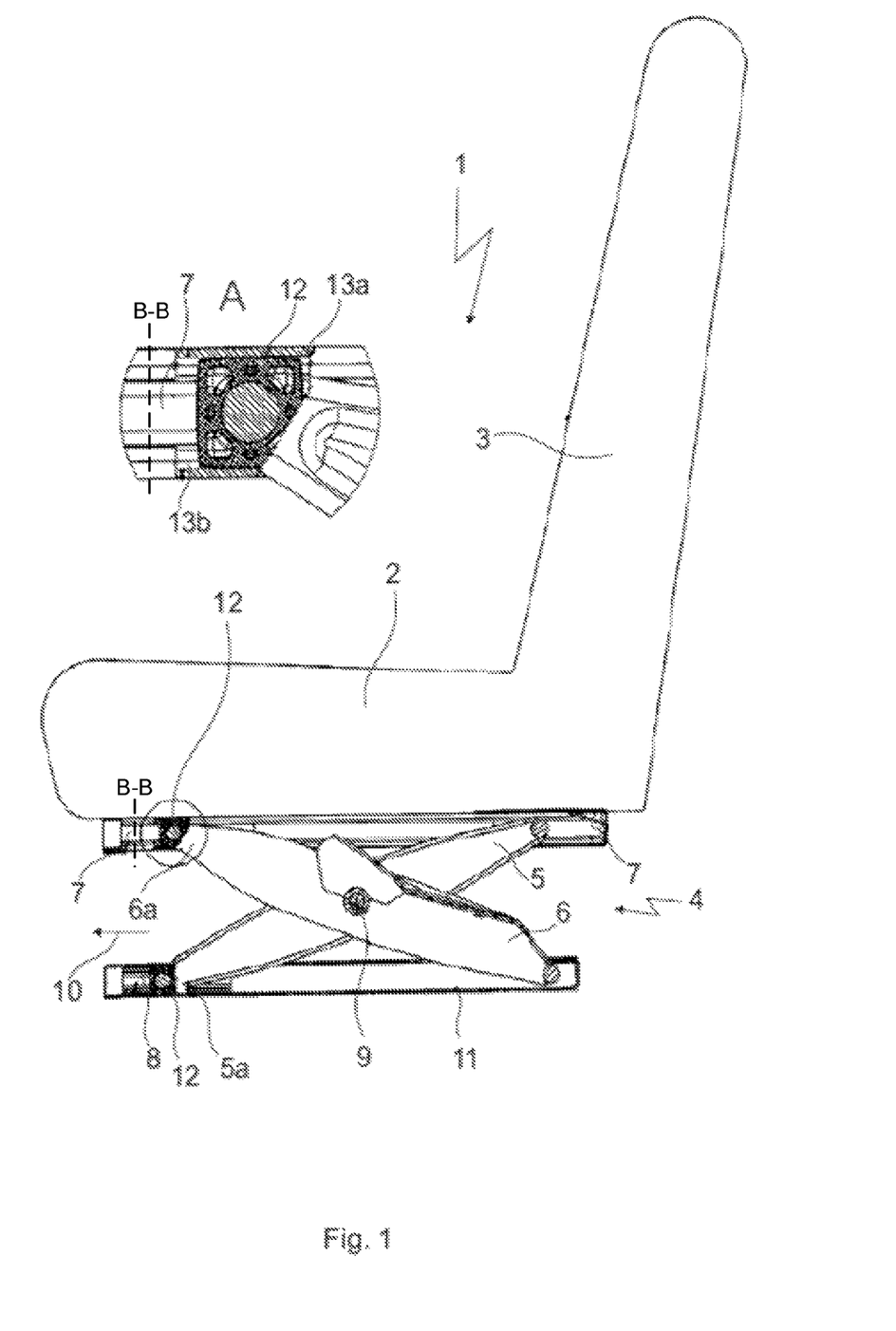
FIG. 1 is a diagrammatic illustration of a vehicle seat with a slide element according to the present invention and a cutaway view of this vehicle seat.

A slide element of this type advantageously comprises at least one substantially cuboidal element, wherein this element slides with at least two mutually opposed first surfaces along sliding faces 13$a$, 13$b$ of the guide rail 7 which preferably has a U-shaped cross-sectional profile along a plane B-B, as shown in FIG. 1. The arrangement of a cuboidal slide element of this type inside U-shaped guide rails ensures a high degree of security against loosening of the ends of the scissor arms out of the guide rails, even if for example a serious collision occurs. This is because the U-shaped cross-sectional profiles embrace the slide element, which is made cuboidal, on its top side and underside, which represent first surfaces and can even have profiles turned down laterally, so that it is also no longer possible for the slide elements to slide out laterally, i.e. transversely to the displacement direction.

In accordance with a preferred embodiment the first surfaces are designed in such a way that each first surface has a flat first face situated in the central region of the first surface and—as viewed in the displacement direction—at least one flat or curved second face situated behind the first face and at least one flat or curved third face situated in front of the first face.

The second face—as viewed in the displacement direction—is designed to extend sloping from the first face towards a first end of the first surface. The third face, on the other hand—as viewed in a direction opposed to the displacement direction—is designed to extend sloping from the first face towards a second end of the first surface.

The design of such second and third faces prevents tilting of the slide element designed in a cuboidal manner from taking place in the event of displacement of the slide element in the forward and reverse directions, i.e. in the displacement direction.

In fact, on account of these sloping second and third faces, jamming of the slide element can be prevented even in the case of a rapid displacement in the displacement direction inside the guide rail, since when sliding forwards the slide element slides on the upper second face and the lower third face by slight turning of the slide element suspended in an articulated manner and when sliding backwards it slides on the upper third faces and the lower second face. This leads to the slide element not remaining suspended and no jerking taking place, as could happen in the event of tilting of an exactly cuboidal element, if little clearance is present between the sliding faces of the guide rail and the slide element. In this way, tilting and jerking during the displacement movement are prevented by a slight rotation of the slide element which is arranged so as to be rotatable on the first end of a scissor arm by means of a shaft extending perpendicularly to the guide rail.

In accordance with a further development of the invention the first and/or second and/or third face—as viewed perpendicularly to the displacement direction—has or have sloping faces starting from the central region of the face towards edge regions of the element. As a result, it is also possible for an undesired lateral tilting of the slide element to be prevented.

The second and third face can be arranged in the form of a flat face with an angle in a range of from $0.05°$ to $5.0°$ with respect to a plane of the sliding face of the guide rail. Such angles, of which $0.2°$ is preferably used as the angular dimension, have proven successful in their order of magnitude since the non-jamming sliding of the slide elements inside the guide rail, which embrace the slide element at least on the top side and underside, is possible on the one hand and as little clearance as possible is provided between the sliding faces of the guide rail and the surfaces of the slide element even in a sliding state on the other hand.

In accordance with a further embodiment the first surfaces are designed in such a way that every first surface has two flat faces which—as viewed in the displacement direction—extend sloping from a central region of the first surface towards a first and second end of the first surface. On account of such a design in the manner of a gabled roof—when viewed from the side or in cross-section—of the surface of the slide element, a reduction of the face portions from three or—if faces sloping at the side are desired—nine to a total of two faces or—if faces sloping at the side are desired—also to a total of six face portions respectively.

In contrast to the first embodiment of the invention named above, enlarged sliding faces, namely the fifth faces, are available during a sliding movement and in this respect there is a lower degree of wear as compared with the previously named embodiment with three or nine face portions respectively. In this case it is nevertheless a drawback that a greater degree of clearance has to be present between the sliding faces of the guide rails and the surface of the slide element, since the angle between the fifth faces and a plane of the sliding face of the guide rail has to be selected from a range of from 0.1° to 15.0° in order to ensure a satisfactory operation of the sliding movement.

The slide elements are attached in a rotatable manner in each case to the first end of the scissor arm by at least one shaft, which extends perpendicularly to the guide rail and which is likewise preferably made horizontal, and they engage in a recess which is preferably provided centrally in the slide element to this end and which need not necessarily pass through the whole of the slide element, but extends for example only as far as half the width of the slide element.

Further advantageous embodiments are set out in the subclaims.

Advantages and useful features may be seen in the following description in conjunction with the drawing. In the drawing

FIGS. 11 and 11a are a diagrammatic illustration of the seat frame illustrated in FIGS. 10 and 10a during a downwardly directed movement, and FIGS. 12 and 12a are a diagrammatic illustration of the seat frame illustrated in FIGS. 10, 10a, 11 and 11a with the associated cut-away views in a neutral position, i.e. without movement.

FIG. 1 is a diagrammatic side view of a vehicle seat 1 together with the slide element according to a first embodiment of the invention, and also a cut-away illustration.

The vehicle seat 1 is formed from the seat part 2 and the backrest 3 and comprises the seat frame 4 which is situated between an upper seat part—which is formed from the seat part 2 and the backrest 3 as well as an upper frame in the manner of a framework which inter alia has a guide rail 7—and a lower seat part which can likewise be constructed in the manner of a framework or from two separate rails 11, and inter alia contains a guide rail 8.

In addition, the seat frame 4 comprises two scissor arms 5, 6 which are connected to each other in a rotatable manner by means of a shaft which preferably extends transversely to the direction of the vehicle seat or the sitting direction of the person who is using the vehicle seat.

The scissor arms 5, 6 can be connected in a fixed manner at their rear end or—as viewed in the plane of the drawing—at their right-hand end to the lower seat part rail 11 and a portion of the upper seat part with which the guide rail 7 is associated. Alternatively, they can be displaceable in the displacement direction 10 and in a direction opposed to the displacement direction 10. A fixed locking of at least the right-hand or rear end of the scissor arm 6 is preferred.

According to the invention a front end 5a and 6a of the scissor arms 5, 6 is connected to slide elements 12 and can be displaced in the displacement direction 10 or in a direction opposed to the displacement direction 10 by means of these slide elements which are preferably produced from plastics material and which have a high degree of hardness. This is necessary if the seat is to undergo height-displacement, i.e. the two scissor arms are to be deflected towards the top or the bottom and are thus also to be displaced in the direction of the displacement direction or in a direction opposed to this displacement direction by means of the slide elements.

As shown in a cut-away illustration A in FIG. 1, the slide element inside the guide rail 7 is reproduced in an enlarged illustration. It is evident from this illustration that the slide element slides with its upper surface and its lower surface along sliding faces 13a and 13b of the guide rail if it is displaced backwards and forwards or—as viewed in the plane of the drawing—to the left and the right.

Figure 2:
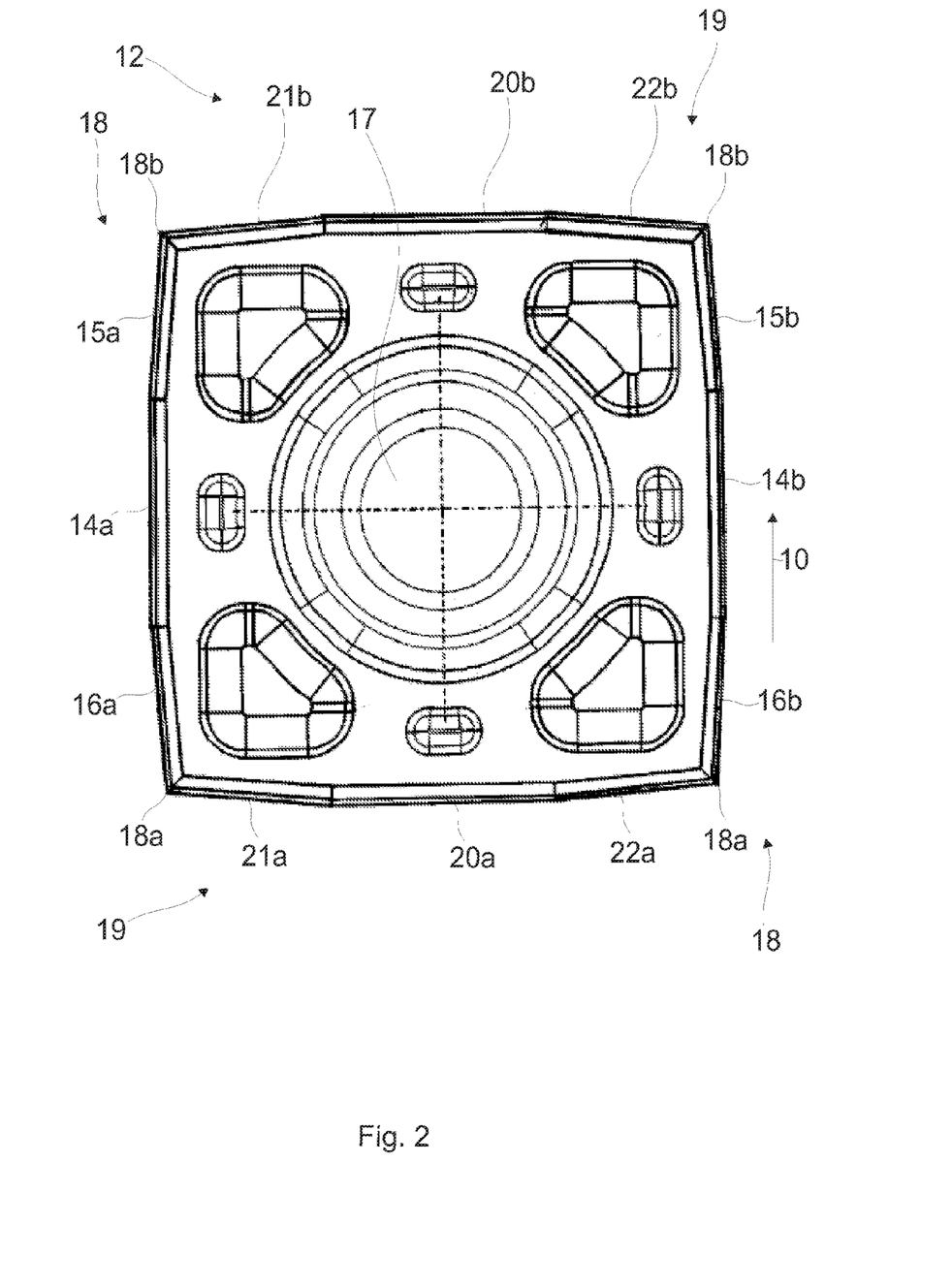
FIG. 2 is a side view of the slide element for a vehicle seat according to a first embodiment of the invention.

The slide element, which is preferably produced from hard plastics material in order to have satisfactory sliding properties with respect to the guide rail 7 and 8 which is preferably produced from metal, is illustrated in a side view in FIG. 2. The slide element 12, which has a substantially cuboidal shape, has according to the invention machined first surfaces 18 which are arranged so as to slide at the top and bottom along sliding faces of the guide rails, and surfaces 19 which are arranged at the front and the rear, as viewed in the direction of the vehicle seat. In this case it should be noted that the front and rear surfaces 19 have a similar machining to the surfaces 18 situated at the top and bottom, even if the surfaces 19 situated at the front and the rear are not used as sliding faces in order to ensure freedom from assembly errors. In this way, even if the cuboidal slide element is inserted inadvertently turned through 90° into the guide rail during assembly, it will remain fully functional. This applies to all the embodiments described in this patent application.

It is evident from the side view—reproduced in FIG. 2—of the slide element for a vehicle seat according to the first embodiment of the invention that the first surfaces 18 with a first end 18a and a second end 18b have a central first face 14a and 14b which—if the vehicle seat momentarily has a horizontal orientation—are likewise orientated horizontally. Starting from these central first faces 14a and 14b—as viewed in the displacement direction 10—a second face 16a and 16b is arranged behind the first flat face 14a and 14b which constitutes a slope of the cuboidal element and thus slopes starting from the first face 14a and 14b in the direction of the first end 18a of the first surface 18.

A third face 15a and 15b is likewise arranged which—as viewed in the displacement direction—is arranged in front of the first face 14a and 14b and extends in a sloping manner starting from the first face 14a and 14b in the direction of the second end 18b of the first surface 18.

As a result of the design of these three faces 14a, 15a and 16a, and 14b, 15b and 16b respectively it is advantageously made possible for the slide element to be able to rotate slightly during the displacement movement about a shaft, which is mounted centrally in a recess 17 in the slide element, without in this case becoming stuck inside the guide rail which is preferably made U-shaped in cross-section or without becoming jammed inside this guide rail. This is because a rotation which takes place in the horizontal direction on account of the displacement force will result in sliding of the slide element on the faces 15b and 16a during a displacement movement directed forwards in the displacement direction 10 and sliding on the faces 15a and 16b during a displacement movement directed in a direction opposed to the displacement direction 10. This always ensures, in a reliable manner, sliding between the sliding faces 13a and 13b of the guide rail and the slide element 12 whilst retaining a slight clearance or interspace or play between the sliding faces of the guide rail and the surfaces 18 of the slide element.

Figure 3:
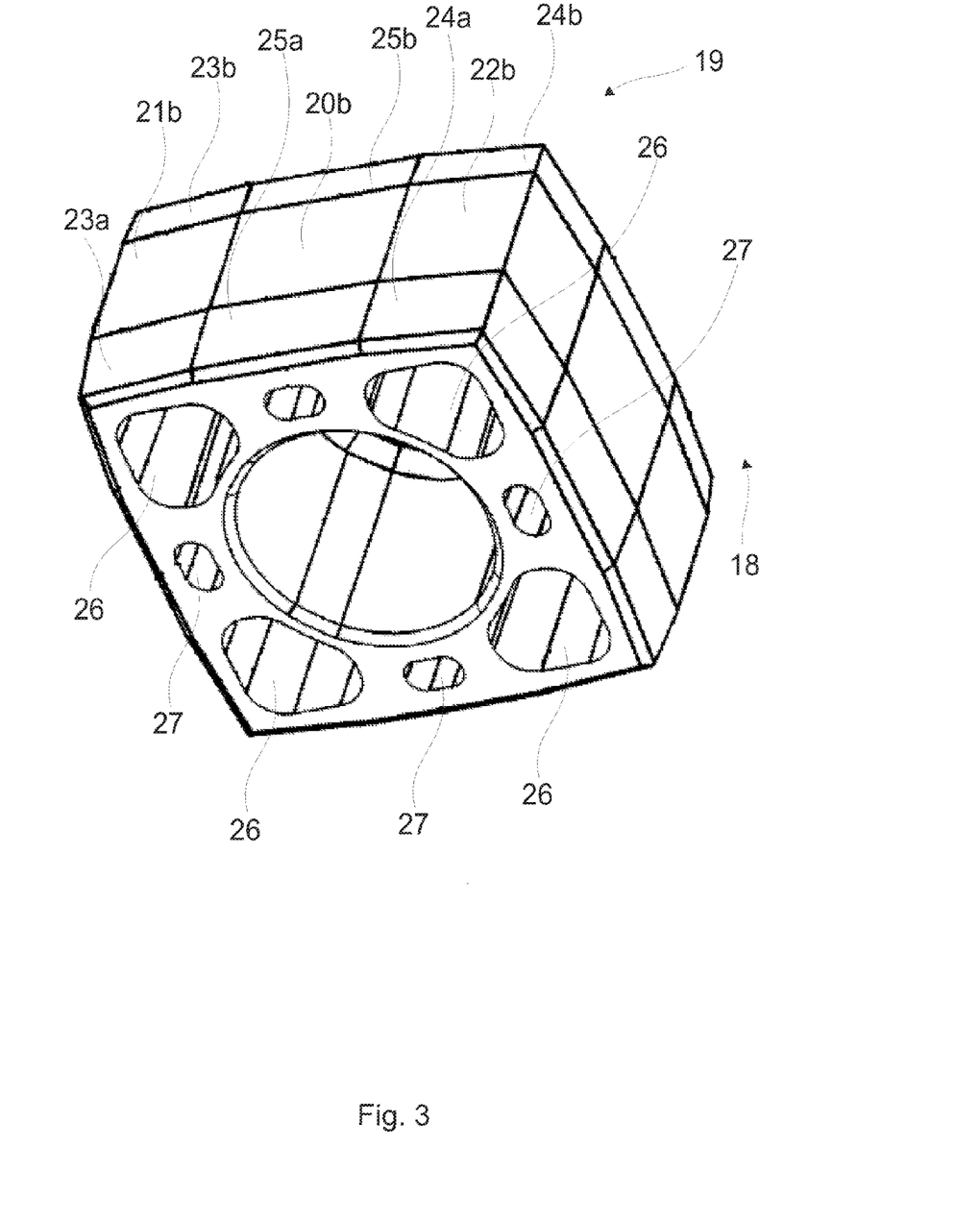
FIG. 3 is a perspective illustration of the slide element for a vehicle seat according to the first embodiment of the invention.

It is evident from the side view—shown in FIG. 2—of the slide element according to the first embodiment and the perspective illustration as reproduced in FIG. 3, that the front and rear surfaces of the slide element likewise have a tripartite division of the surface. This ensures not only an error-free assembly, even if the slide element is inadvertently turned through 90° into the guide rail during assembly, but it is also made possible for a subsequent turning of the slide element through 90° after wear of the sliding surfaces 18 has taken place through 90°, so that the sliding surfaces 19 are now turned upwards and downwards and extend along the sliding faces 13a and 13b of the guide rail.

As a result, it is evident from the illustrations of FIGS. 2 and 3 that a front side directed towards the front and a rear side directed towards the rear likewise have a first face 20a and 20b situated in the central region of the surface 19 as well as a second face 21a and 21b and a third face 22a and 22b. The second and third faces 21a, 21b and 22a, 22b are in turn designed so as to slope, starting from the first face 20a, 20b, towards the end regions at the edge of the surfaces 19.

It is additionally evident from FIG. 3 in this perspective illustration that the surfaces 20b, 21b and 22b as well as the surfaces 14a, 15a, 16a as well as 14b, 15b and 16b and 20a, 21a, 22a can have fourth faces 23b, 24b and 25b as well as 23a, 24a and 25a sloping towards the lateral edge of the slide element.

These faces which slope towards the lateral edge regions of the slide element advantageously make it likewise possible for jamming in the lateral direction and simplified assembly of the slide element into the guide rail to take place. In addition, during the sliding movements this makes it possible for contamination caused by particles or chips resulting from the wear of the sliding faces to be forced into the lateral regions between the sliding faces 13a and 13b of the guide rail as well as the faces 23a, 24a, 25a as well as 23b, 24b, 25b, without obstructing the actual sliding movement or obstructing or impairing the actual sliding faces 20b, 21b and 22b or—transferred to the other faces—14a, 15a and 16a as well as 14b, 15b and 16b.

In addition, in order to save weight and for stabilization purposes the slide element has recesses 26, 27 which can be designed in any desired manner.

Figure 4:
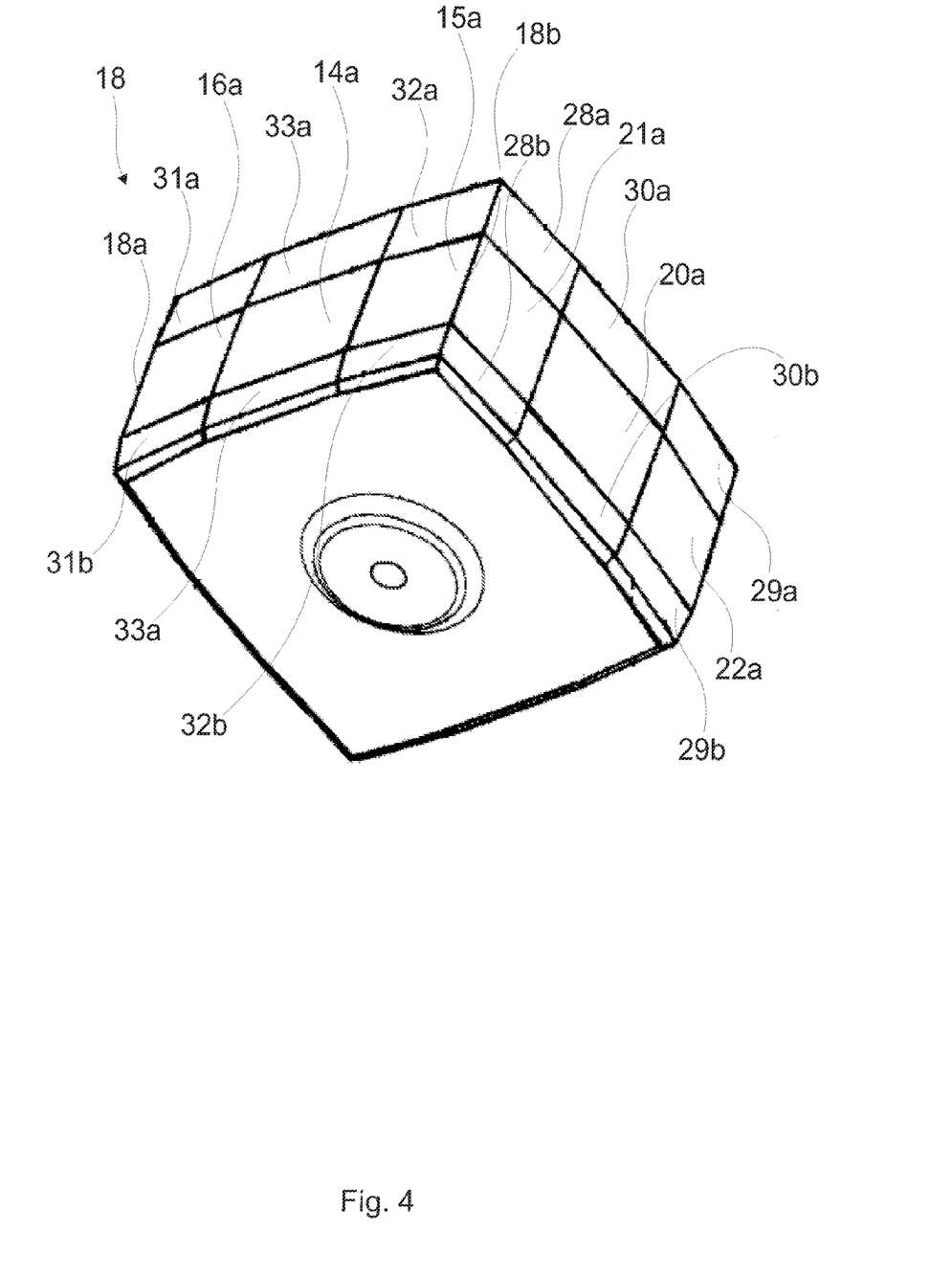
FIG. 4 is a further perspective illustration of the slide element for the vehicle seat according to a first embodiment of the invention.

The slide element for the vehicle seat in the first embodiment is shown in FIG. 4 in a further diagrammatic illustration. It is evident from this illustration too that all the surfaces 18, 19 can have not only the sliding first, second and third faces 14a, 15a, 16a as well as 20a, 21a and 22a situated centrally with respect to the longitudinal axis of the surface 18, 19, but also faces 31a, 32a and 33a as well as 31b, 32b and 33b or 28a, 29a and 30a as well as 28b, 29b and 30b sloping laterally towards the edges.

The first faces 14a or—as is evident from this illustration according to FIG. 4—20a can be for example a face situated centrally and with a dimension of 7 mm by 7 mm.

Figure 5A:
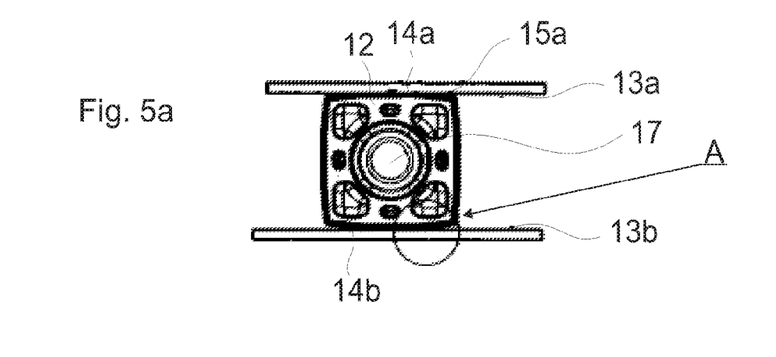
FIGS. 5a and 5b are a side view together with a cut-away illustration of the slide element for the vehicle seat according to the first embodiment of the invention with a first angular setting of the slide element.
Figure 5B:
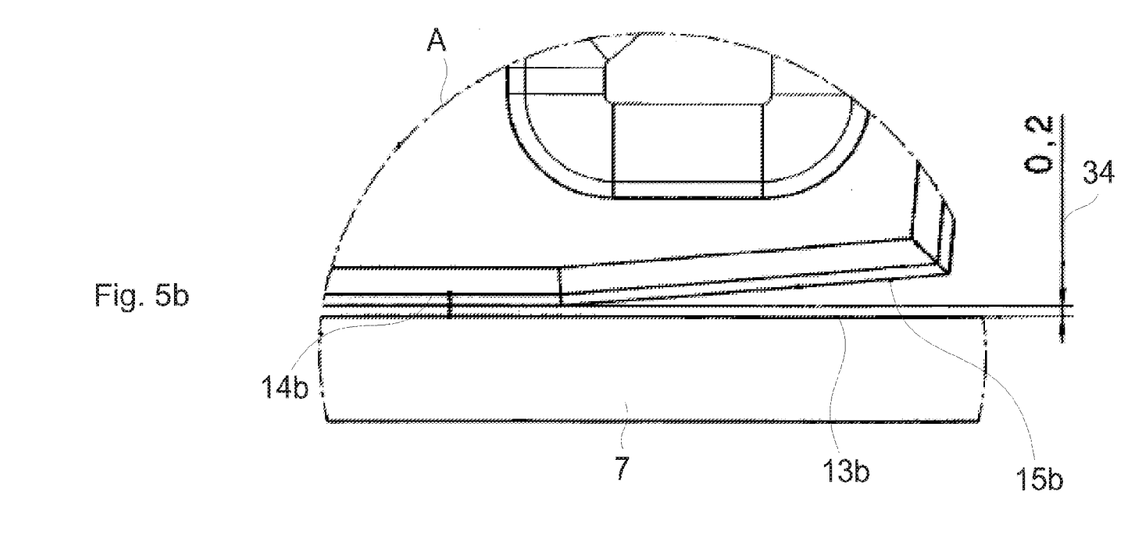

A side view and a cut-away illustration with the slide element for a vehicle seat according to the first embodiment are shown in FIGS. 5a and 5b. FIG. 5a shows in a diagrammatic illustration that the slide element 12 of a guide rail is arranged between the sliding faces 13a and 13b and momentarily has a rotational position with an angle of 0° provided with respect to the shape of the extension plane of the sliding faces 13a, 13b.

A shaft (not shown in detail in this case), which is connected to first ends 5a, 6a of the scissor arms 5, 6 and which arranges the slide element on the first end in a pivotable manner, is arranged inside the recess 17.

It is likewise evident from this illustration that the first faces 14a and 14b are momentarily in direct contact with the sliding faces 13a and 13b of the guide rail.

In the enlarged illustration A as shown in FIG. 5b it is shown that the first face 14b in this angular setting of the slide element is momentarily at a distance from the sliding face 13b of the guide rail with a play 34 of 0.2 mm for example. A third face 15b is at an angle with respect to the first face 14b and in this angular setting of 0° with respect to the guide rails the slide element is not in contact with the sliding face 13b.

Figure 6A:
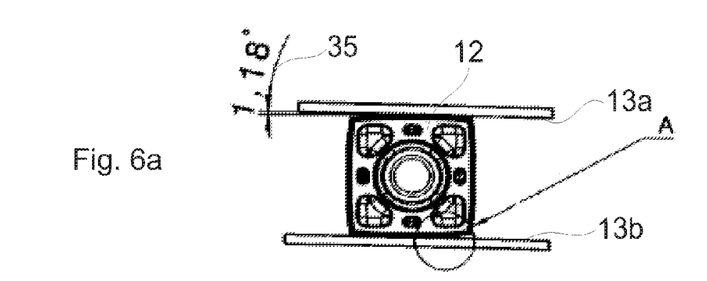
FIGS. 6a and 6b are a side view of the slide element for the vehicle seat according to the first embodiment of the invention with a second angular setting of the slide element.
Figure 6B:
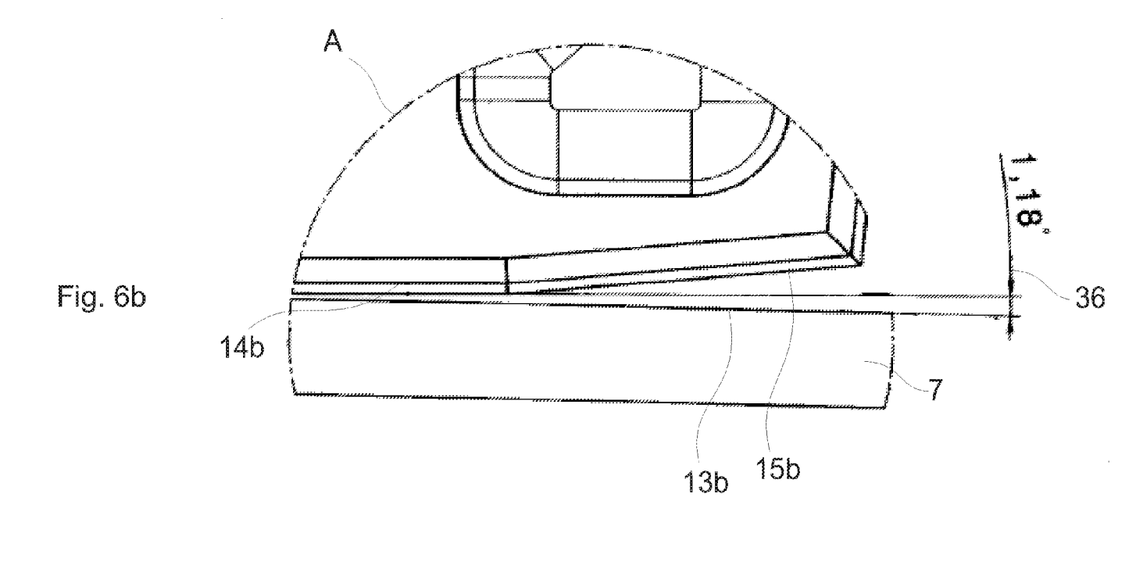

In FIGS. 6a and 6b the slide element for the vehicle seat according to the first embodiment is shown in similar illustrations to FIGS. 5a and 5b, with the exception of the fact that the slide element is now in an angular setting with an angle of 1.18° as shown by the reference number 35 with respect to the plane of the sliding faces 13a, 13b, as can occur during a sliding movement.

In the illustration A enlarged in FIG. 6b it is shown that the first face 14b is now arranged at an angle 36 in the order of magnitude of 1.18° with respect to the sliding face 13b of the guide rail 7. Although the third face 15b is still at a greater distance from the sliding face 13b of the guide rail 7, a second face 16b (not shown in detail in this case) is now in contact with the sliding face 13b to an increased degree, since—as viewed in the plane of the drawing—the slide element 12 is pivoted towards the left. This permits a jamming-free sliding of the slide element and at the same time the use of the largest possible sliding faces on account of the design of the slide element according to the invention with respect to the surfaces thereof.

Figure 7A:
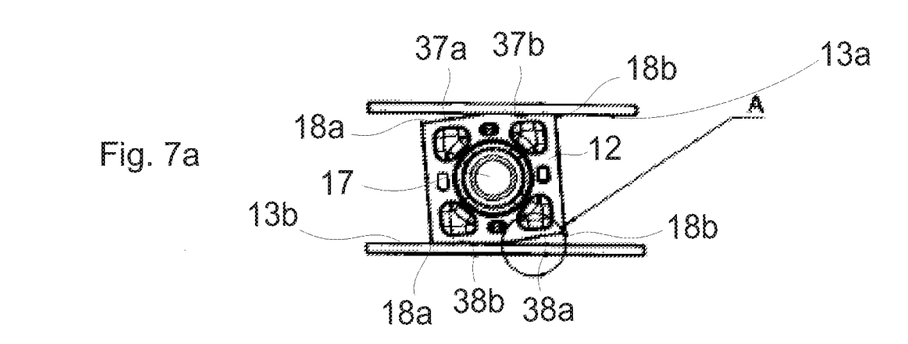
FIGS. 7a and 7b are a side view of the slide element for a vehicle seat according to a second embodiment of the invention together with a cut-away illustration.
Figure 7B:
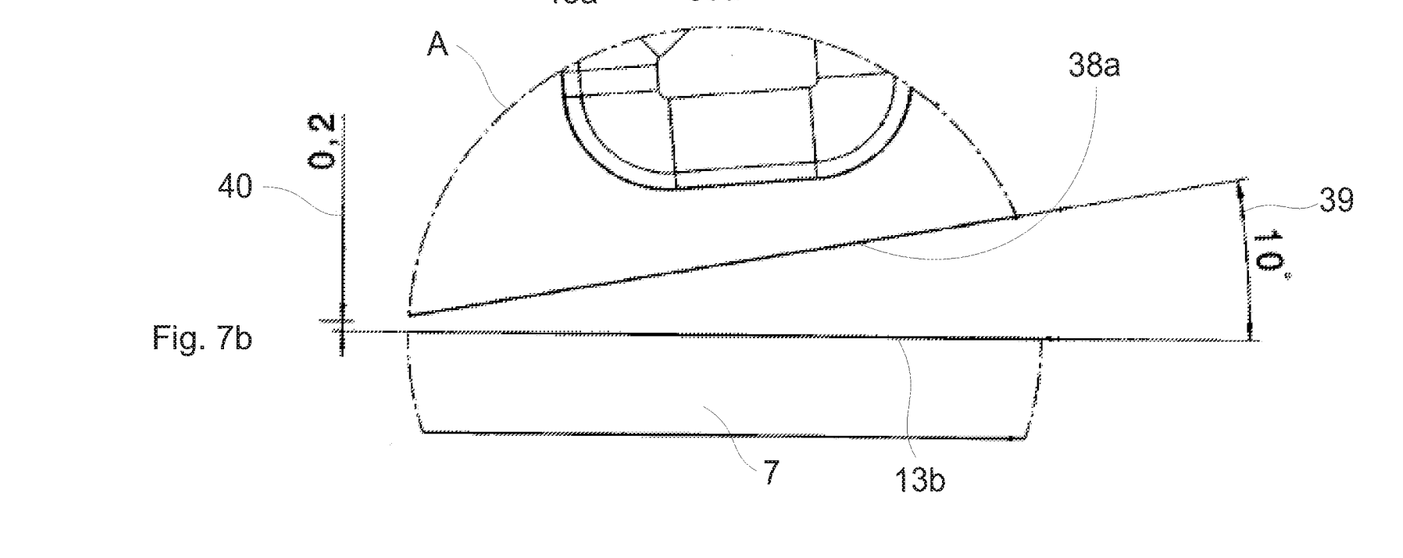

The slide element for a vehicle seat according to a second embodiment of the invention is shown in FIGS. 7a and 7b. This slide element 12 differs from the slide element shown in FIGS. 5a, 5b and FIGS. 6a and 6b in that the first surfaces 18 are made, not tripartite, but bipartite in their shape. This means that fifth faces 37a, 37b or 38a and 38b respectively are arranged in such a way that in an angular setting of the slide element 12, as shown in this case by the reference number 39 with an angle of 10°, a sliding on the two faces 37b and 38b takes place. If, however, the displacement movement of the slide element takes place in the opposite direction, then sliding on the faces 37a and 38a will take place.

It is likewise evident from the illustrations as shown in FIGS. 7a and 7b that a play 40 between the sliding face 13b and the surface 18 with the fifth face portion 38b of 0.2 mm according to the reference number 40 can be present.

Figures 8A, 8B:
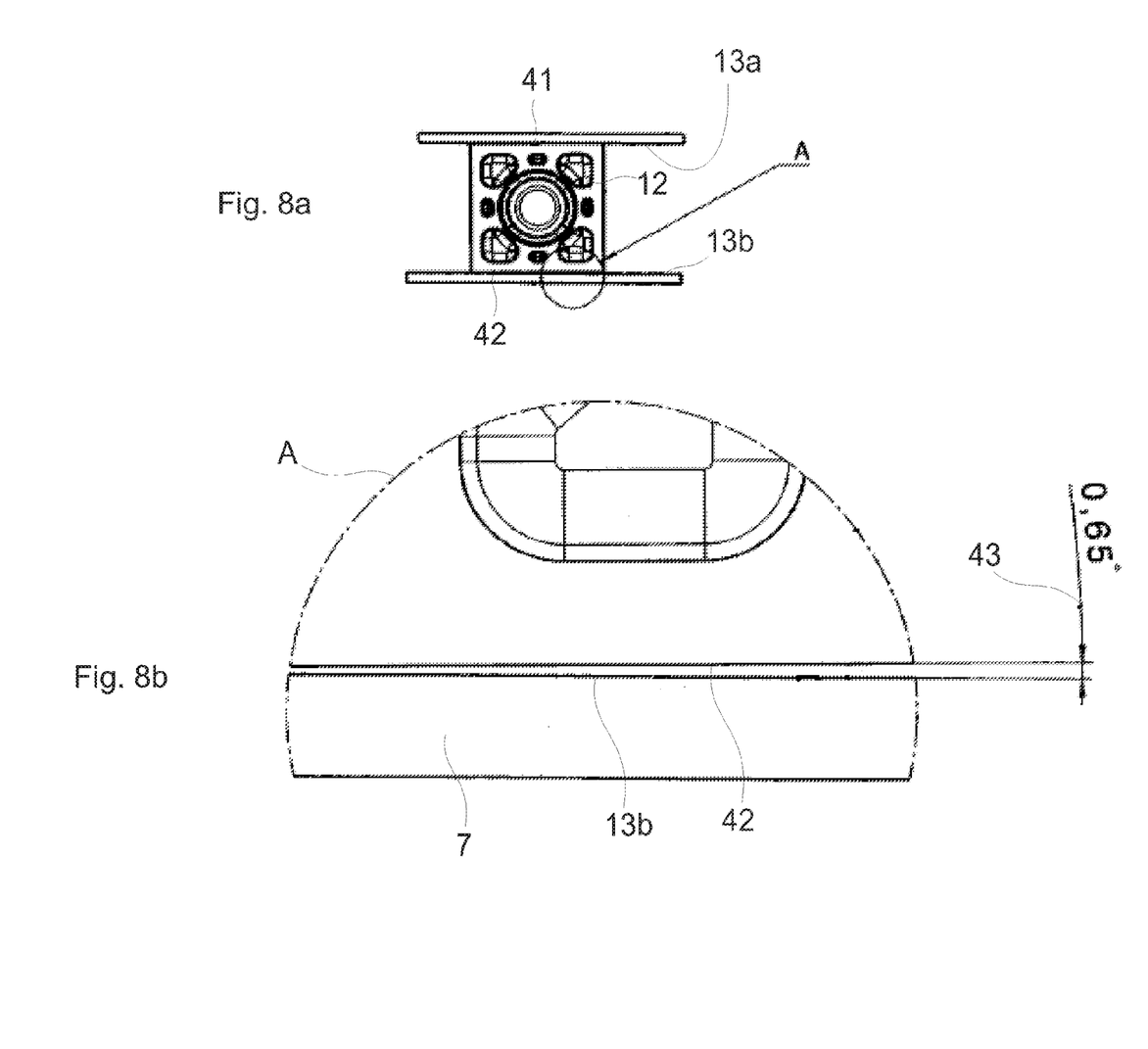
FIGS. 8a and 8b are a side view with a cut-away illustration of the slide element for the vehicle seat according to a third embodiment of the invention in a first angular setting of the slide element.

The slide element for a vehicle seat according to a third embodiment of the invention is shown in a side view and in a cut-away illustration in FIGS. 8a and 8b. The slide element according to this embodiment differs from the previously described embodiments in that the first surfaces 18 are formed in one part only with respect to their sliding faces, i.e. there is not a plurality of face portions which are arranged converging at an angle but only one face 41 and 42. In the case of an angular setting 43 of for example 0.65° the face 42 of the first surface would then be arranged at an angle with respect to the sliding face 13b of the guide rail.

Figures 9A, 9B:
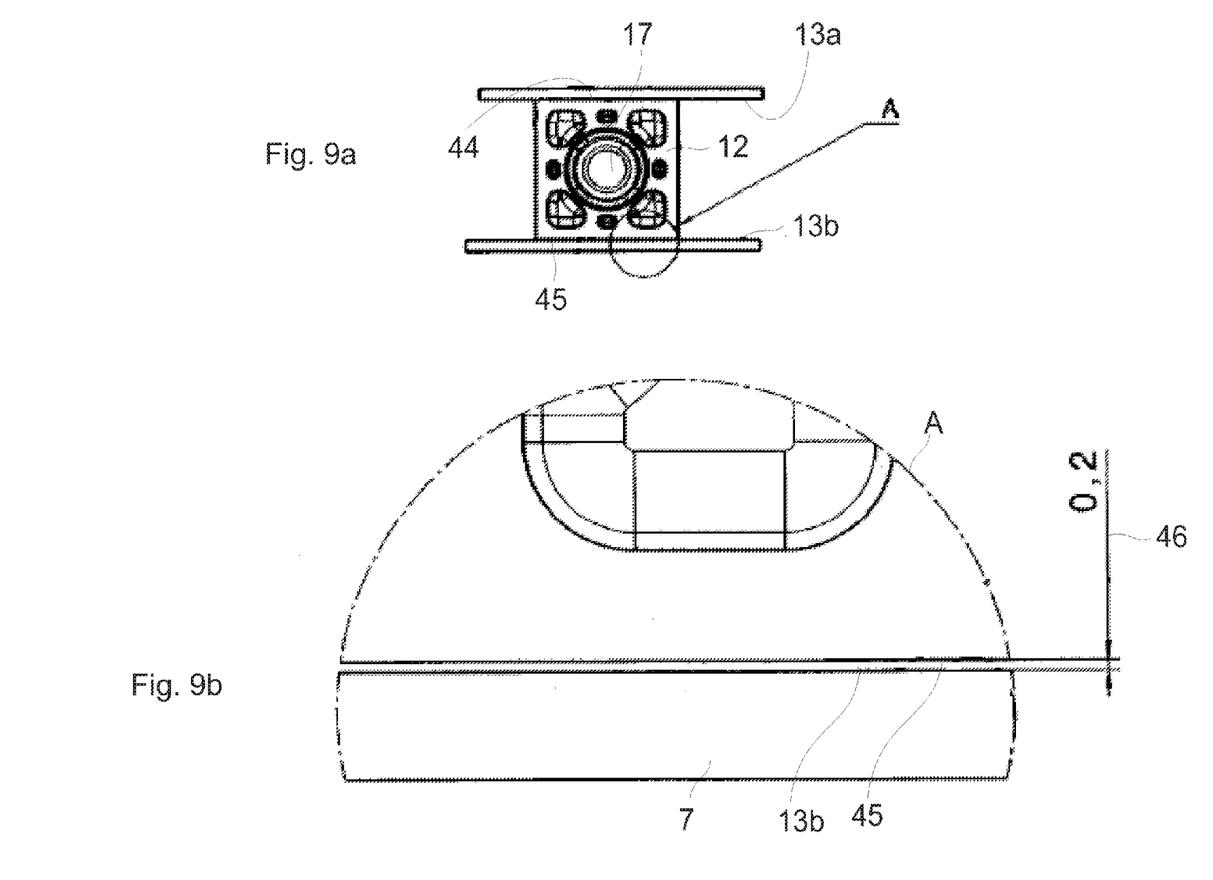
FIGS. 9a and 9b are a side view and a cut-away illustration of the slide element for a vehicle seat according to the third embodiment of the invention in a second angular setting of the slide element.

In the case of an angle of 0° on the other hand, as is shown in the illustration according to FIGS. 9a and 9b, the two surfaces 44 and 45 are spaced at approximately the same distance or play 46 of for example 0.2 mm with respect to the sliding faces 13a and 13b of the guide rails.

Figure 10A:
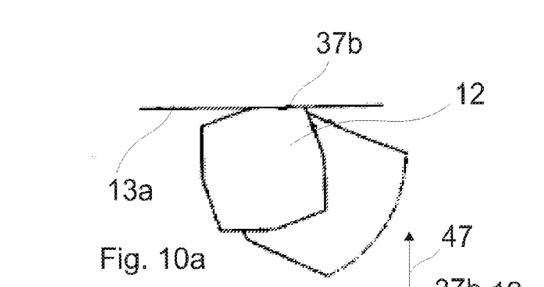
FIGS. 10 and 10a are a diagrammatic illustration of a frame of the vehicle seat with a slide element of the second embodiment during an upwardly directed movement of the seat frame.
Figure 10B:
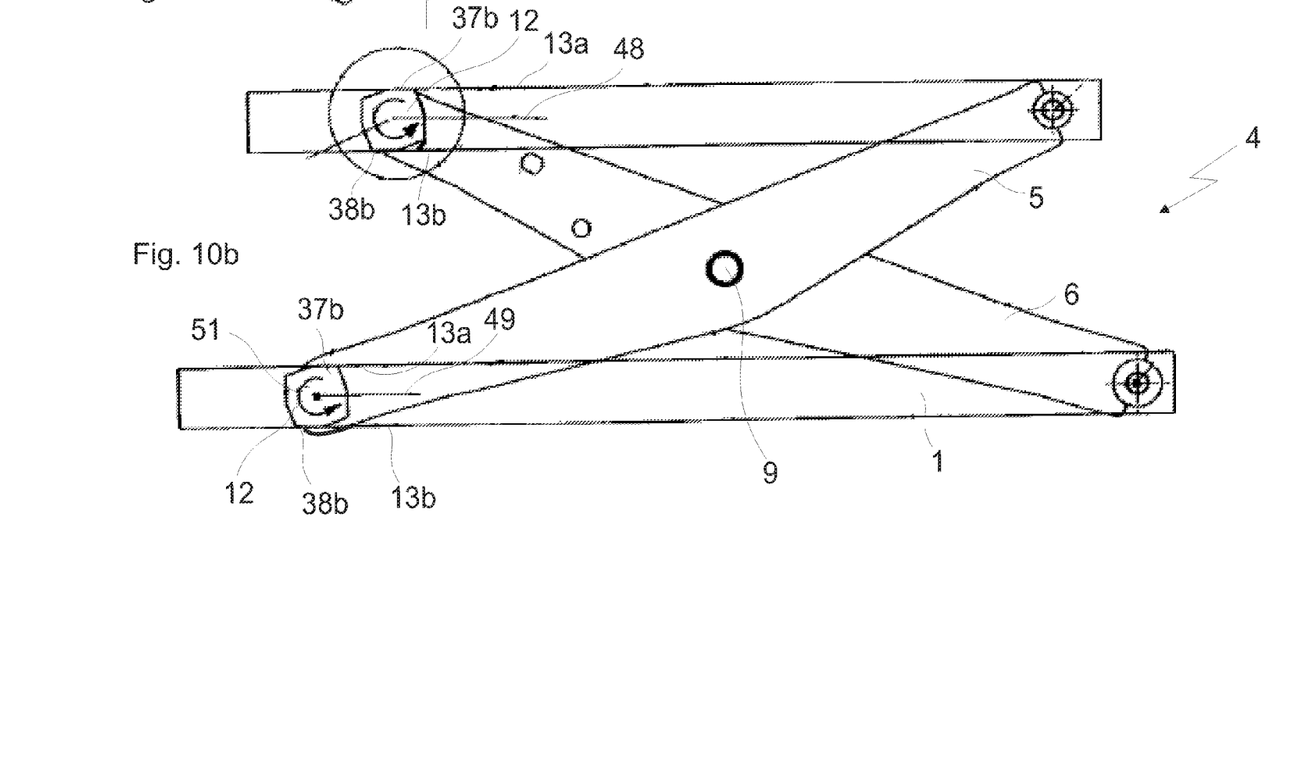

The seat frame with slide elements according to the second embodiment of the invention during an upwardly directed movement of the seat frame is shown in a diagrammatic illustration in FIG. 10. The seat frame 4 has the parts already specified. During an upwardly directed movement in accordance with the arrow 47 the slide elements 12 slide on their faces 37b and 38d along the sliding faces 13a and 13b of the guide rail. During this upwardly directed movement the slide elements 12 are displaced towards the right—as viewed in the plane of the drawing—in accordance with the arrows 48 and 49. This leads to a rotation of the slide elements in accordance with the arrows 50 and 51.

An enlarged illustration of a slide element 12 with respect to the sliding face of the guide rail is shown in FIG. 10a.

The seat frame 4 during a downwardly directed movement in accordance with the arrow 52 is shown in a diagrammatic illustration in FIG. 11. In this case the slide elements 12 slide towards the left—as viewed in the plane of the drawing—in accordance with the arrows 53 and 54. This has the result that a rotation of the slide elements 12 in accordance with the arrows 55 and 56 takes place in the opposite direction with respect to the rotation shown in FIG. 10.

Figures 11A, 11B:
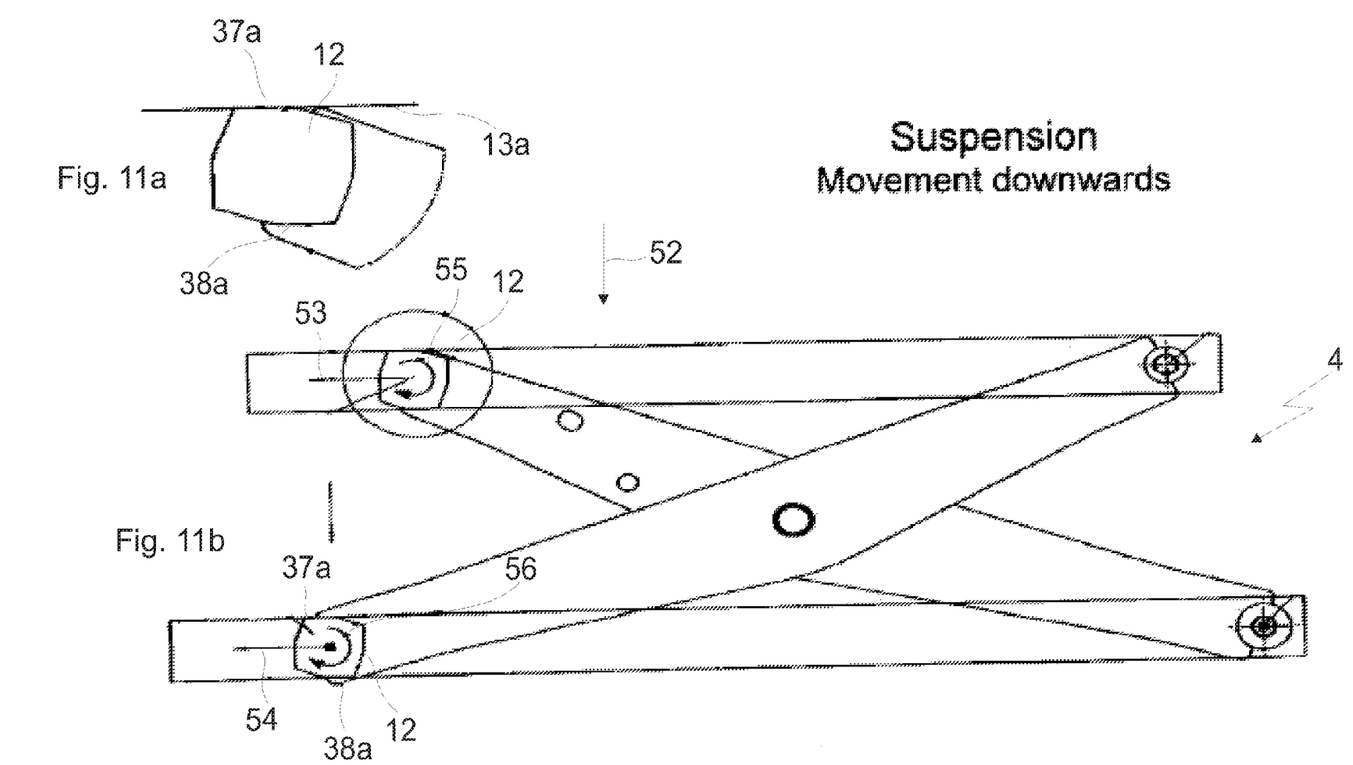

A cut-away view of a slide element in this position with respect to the sliding face 13a of the guide rail is shown in FIG. 11a. In this case the sliding faces 37a and 38a are in contact with the sliding faces of the guide rail.

Figures 12A, 12B:
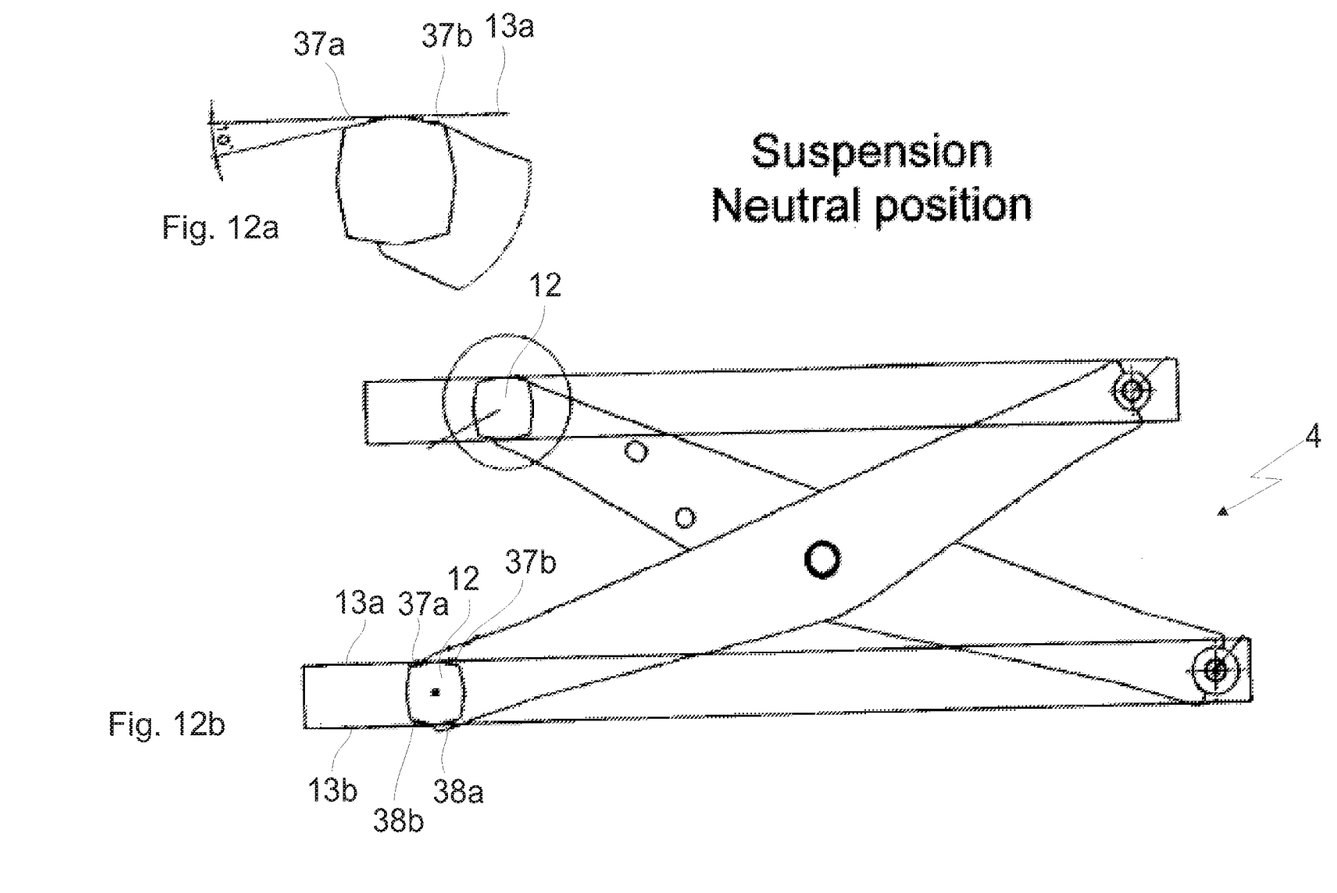

The seat frame as shown in FIGS. 10 and 11 is shown in a neutral position, i.e. without movement, in a diagrammatic illustration in FIG. 12. In this position the slide elements 12 are in contact neither with the sliding face 37a nor with the sliding face 37b or with the sliding face 38a and 38b as well as with the sliding faces 13a and 13b of the guide rail. This is also evident from the enlarged illustration in FIG. 12a.

All the features disclosed in the application documents are claimed as being essential to the invention, insofar as they are novel either individually or in combination as compared with the prior art.

LIST OF REFERENCES

1 vehicle seat
2 seat part
3 backrest
4 seat frame
5, 6 scissor arms
5a, 6a front end of the scissor arms
7, 8 guide rail
10 displacement direction
11 separate rails
12 slide element
13a, 13b sliding faces of the guide rail
14a, 14b first faces
15a, 15b second faces
16a, 16b third faces
17 recess
18 first surface
18a first end
18b second end
19 front and rear surfaces
20a, 20b first faces
21a, 21b second faces
22a, 22b third faces
23a, 23b fourth faces
24a, 24b faces
25a, 25b faces
34 play
35, 36 angle
37a, 37b fifth faces
38a, 38b fifth faces
39 angle
40 play
41, 42 face
43 angular setting
44, 45 surfaces
46 play
47, 48, 49, 50,
51, 52, 53, 54,
55, 56 arrows

The invention claimed is:

1. A vehicle seat with an upper seat part (2, 3) comprising a seat part (2) and a backrest (3) and a lower seat part (11), wherein a height-adjustable seat frame (4) with at least two scissor arms (5, 6) connected to each other in a rotatable manner is arranged between the upper seat part (2, 3) and the lower seat part (11), characterized in that at least one first end (5a, 6a) of at least one of the scissor arms (5, 6) is connected to at least one slide element (12) for the displacement of the first end (5a, 6a) along at least one guide rail (7), wherein the slide element (12) is at least one substantially cuboidal element (12), which slides with at least two mutually opposed first surfaces (18) along sliding faces (13a, 13b) of the guide rail (7) characterized in that each first surface (18) has a flat first face (14a, 14b) situated in a central region of the first surface (18) and at least one flat or curved second face (16a, 16b) situated proximal to the first end (5a, 6a) of the scissor arm (5, 6) and at least one flat or curved third face (15a, 15b)

situated distal to the first end (5a, 6a) of the scissor arm (5, 6), wherein the first, second and third faces are arranged linearly, wherein one of the faces (37a, 37b, 38a, 38b) is arranged in such a way that in an angular setting of the slide element (12) a sliding on said face (37a, 37b, 38a, 38b) will take place, and wherein second surfaces (19) which are arranged in the front and the rear of the slide element (12) and substantially perpendicular to a longitudinal axis of the guide rail (7) have a similar shape to the first surfaces (18).

2. The vehicle seat according to claim 1, characterized in that the second face (16a, 16b) extends sloping from the first face (14a, 14b) towards a first end (18a) of the first surface (18).

3. The vehicle seat according to claim 2, characterized in that the third face (15a, 15b) extends sloping from the first face (14a, 14b) towards a second end (18b) of the first surface (18).

4. The vehicle seat according to any one of claim 2, characterized in that at least one of the first, second and third faces (14a, 14b; 15a, 15b; 16a, 16b) has a sloping face (31a, b; 32a, b; 33a, b) starting from the central region of the face (14a, b; 15a, b; 16a, b) towards edge regions of the first surface (18) of the slide element (12).

5. The vehicle seat according to any one of claim 2, characterized in that the second and third faces are arranged in the form of flat faces (15a, b; 16a, b) with an angle (34) in a range of from 0.05° to 5.0° with respect to a plane of the sliding face (13b) of the guide rail (7).

6. The vehicle seat according to claim 1, characterized in that each first surface (18) has two flat faces (37a, 37b; 38a, 38b) which extend sloping from a central region of the first surface (18) towards a first and second end (18a, 18b) of the first surface (18).

7. The vehicle seat according to claim 6, characterized in that the flat faces (37a, 37b; 38a, 38b) are arranged at an angle (39) in the range of from 0.1° to 15.0° with respect to a plane of the sliding face (13b) of the guide rail (7).

8. The vehicle seat according to claim 1, characterized in that the slide element (12) is connected in a rotatable manner to the first end (5a, 5b) of the scissor arm (5, 6) by means of a shaft which extends perpendicularly to the guide rail (7) and which is arranged in a recess (17) in the slide element (12).

9. The vehicle seat according to claim 1, characterized in that the guide rail (7) has a U-shaped cross-sectional profile within a plane (B-B) perpendicular to a longitudinal direction of the guide rail (7).

\* \* \* \* \*